(12) United States Patent
Koehler et al.

(10) Patent No.: US 9,025,838 B2
(45) Date of Patent: May 5, 2015

(54) APPARATUS AND METHOD FOR HYBRID RECONSTRUCTION OF AN OBJECT FROM PROJECTION DATA

(75) Inventors: Thomas Koehler, Norderstedt (DE); Axel Thran, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 161 days.

(21) Appl. No.: 13/879,655

(22) PCT Filed: Oct. 17, 2011

(86) PCT No.: PCT/IB2011/054581
§ 371 (c)(1),
(2), (4) Date: Apr. 16, 2013

(87) PCT Pub. No.: WO2012/056361
PCT Pub. Date: May 3, 2012

(65) Prior Publication Data
US 2013/0202166 A1     Aug. 8, 2013

(30) Foreign Application Priority Data
Oct. 26, 2010   (EP) .................................... 10188791

(51) Int. Cl.
*G06K 9/00*   (2006.01)
*G06T 5/00*   (2006.01)
*G06T 11/00*  (2006.01)

(52) U.S. Cl.
CPC .............. *G06T 5/001* (2013.01); *G06T 11/006* (2013.01); *G06T 2211/421* (2013.01); *G06T 2211/424* (2013.01)

(58) Field of Classification Search
USPC ............................................ 359/32; 382/128
See application file for complete search history.

(56) References Cited

U.S. PATENT DOCUMENTS

| 6,696,686 B1 | 2/2004 | Wainer et al. |
| 2007/0098135 A1* | 5/2007 | Kunze ................ 378/4 |

FOREIGN PATENT DOCUMENTS

| SE | 200104045 A | 6/2003 |
| WO | 03094115 A1 | 11/2003 |

OTHER PUBLICATIONS

Sunnegardh, J.; Combining Analytical and Iterative Reconstruction in Helical Cone-Beam CT; 2007; Thesis No. 1301 to Linkoping University Institute of Technology Department of Electrical Engineering; Chapter 7 "Frequency domain partitioning of projection data" pp. 91-109.*

(Continued)

*Primary Examiner* — Gregory F Cunningham

(57) ABSTRACT

The invention relates to an imaging apparatus for imaging an object of interest. An analytical reconstruction unit (12) analytically reconstructs an analytical image of the object from detection data, in particular, from projection data, and an iterative reconstruction unit (13) iteratively reconstructs an iterative image of the object from the detection data, wherein a combination unit (14) combines the analytical image and the iterative image for generating a combination image. An iterative image can comprises shading artifacts, which may be caused by preprocessing the detection data before performing the iterative reconstruction. An analytical image shows reduced shading artifacts, in particular, shows no shading artifacts at all. Thus, by combining the analytical image and the iterative image a combination image can be generated, in which the shading artifacts are reduced in comparison to an iterative image, thereby improving the quality of the reconstructed final image of the object of interest.

20 Claims, 3 Drawing Sheets

(56) References Cited

OTHER PUBLICATIONS

Grass, M., et al.; Angular weighted hybrid cone-beam CT reconstruction for circular trajectories; 2001; Phys. Med. Biol.; 46:1595-1610.
Herman, G. T., et al.; Algebraic Reconstruction Techniques Can Be Made Computationally Efficient; 1993; IEEE Trans. on Medical Imaging; 12(3)600-609.
Heuscher, D., et al.; Redundant data and exact helical cone-beam reconstruction; 2004; Phys. Med. Biol.; 49:2219-2238.
Kachelriess, M., et al.; Extended Parallel Backprojection (EPBP) for Arbitrary Cone Angle and arbitrary Pitch 3D and Phase-Correlated 4D CT Reconstruction; 2004; Institute of Medical Physics; 5 pages.
Mueller, K., et al.; Rapid 3-D Cone-Beam Reconstruction with the Simultaneous Algebraic Reconstruction Technique (SART) Using 2-D Texture Mapping Hardware; 2000; IEEE Trans. on Medical Imaging; 19(12)1227-1237.
Stierstorfer, K., et al.; Weighted FBP—a simple approximate 3D FBP algorithm for multislice spiral CT with good dose usage for arbitrary pitch; 2004; Phys. Med. Biol.; 49:2209-2218.
Taguchi, K., et al.; A new weighting scheme for cone-beam helical CT to reduce the image noise; 2004; Phys. Med.Biol.; 49:2351-2364.
Thibault, J-B., et al.; Correction of Gain Fluctuations in Iterative Tomographic Image Reconstruction; 2007; Proc. of the 9th Intl. Meeting on Fully Three-Dimensional Image Reconstruction in Radiology and Nuclear Medicine; pp. 112-115.

* cited by examiner

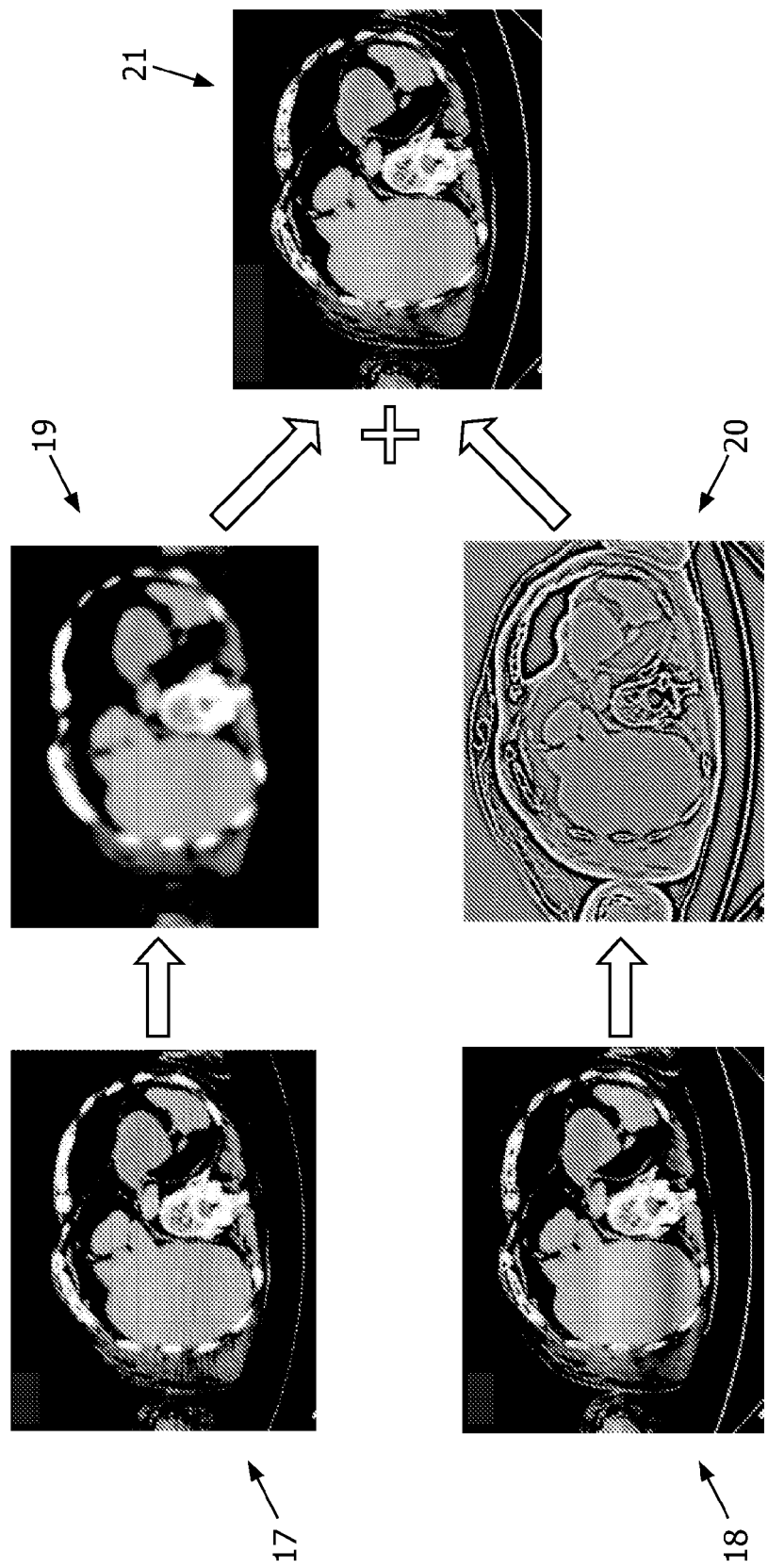

APPARATUS AND METHOD FOR HYBRID RECONSTRUCTION OF AN OBJECT FROM PROJECTION DATA

FIELD OF THE INVENTION

The invention relates to an imaging apparatus, an imaging method and an imaging computer program for imaging a region of interest.

BACKGROUND OF THE INVENTION

The article "Algebraic Reconstruction Techniques Can Be Made Computationally Efficient" by G. T. Herman, IEEE Transactions on Medical Imaging, Vol. 12, No. 3, September 1993 discloses an iterative algebraic reconstruction technique (ART). Starting from an initial image, in each iteration step a) simulated projection data are generated by simulating a forward projection through a current image of an object of interest b), a difference between the simulated projection data and measured projection data is determined, and c) this difference is backprojected for updating the current image of the object of interest.

This reconstruction technique is sensitive to changes in the measured projection data, which can be introduced during a preprocessing step which includes, for example, correction for tube current fluctuations or air calibration. The sensitivity to these changes in the measured projection data may lead to shading artifacts in the reconstructed image and reduces therefore the quality of the reconstructed image.

SUMMARY OF THE INVENTION

It is an object of the present invention to provide an imaging apparatus, an imaging method and an imaging computer program for imaging an object of interest, wherein an image of the object of interest having an improved quality can be generated.

In a first aspect of the present invention an imaging apparatus for imaging an object of interest is presented, the imaging apparatus comprises:

a detection data providing unit for providing detection data being indicative of the object of interest, an analytical reconstruction unit for analytically reconstructing an analytical image of the object from the detection data, an iterative reconstruction unit for iteratively reconstructing an iterative image of the object from the detection data, and a combination unit for combining the analytical image and the iterative image for generating a combination image.

An analytical reconstruction procedure is less sensitive to a preprocessing of the detection data. Shading artifacts in the analytical image are therefore reduced, or the analytical image does not show any shading artifacts. Thus, by combining the analytical image, which comprises reduced shading artifacts or no shading artifacts at all, with the iterative image a combination image can be generated, in which the shading artifacts are reduced in comparison to an iterative image, thereby improving the quality of the reconstructed final image of the object of interest.

The combination unit can be adapted to, for example, sum the analytical image and the iterative image or weightedly average the analytical image and the iterative image for generating the combination image.

It is preferred that the combination unit is adapted to i) apply a first filter to the analytical image for low-pass filtering the analytical image, thereby generating a filtered analytical image, ii) apply a second filter to the iterative image for high-pass filtering the iterative image, thereby generating a filtered iterative image, and iii) combine the filtered analytical image and the filtered iterative image. Noise, which can be predominantly located in high spatial frequencies in the analytical image, can be efficiently suppressed by using the high spatial frequencies of the iterative image, whereas shading artifacts, which can be present in the iterative image, can be suppressed by using the low spatial frequencies of the analytical image. Thus, the combined image can have a relatively low noise value, which corresponds to a noise value of an iterative image, and reduced shading artifacts or no shading artifacts at all. The quality of the final image can therefore be further improved.

The combination unit is preferentially adapted to perform the filtering by Fourier transforming the analytical image and the iterative image, applying a first transfer function, which defines the first filter, to the Fourier transformed analytical image, applying a second transfer function, which defines the second filter, to the Fourier transformed iterative image, and inversely Fourier transforming the analytical image and the iterative image. The combination unit can be adapted to combine the filtered analytical image and the filtered iterative image in the Fourier domain or in the spatial domain. Thus, the combination unit can be adapted to combine the filtered analytical image and the filtered iterative image before the inverse Fourier transformation is performed or after the inverse Fourier transformation has been performed, wherein, of course, if the combination is performed before the inverse Fourier transformation is carried out, the resulting combination image is inversely Fourier transformed. In the Fourier domain, the first and second transfer functions are preferentially applied to the Fourier transformed analytical image and the Fourier transformed iterative image, respectively, by multiplying the respective transfer function by the respective Fourier transformed image.

In an embodiment, the first transfer function $H_1(k)$ is defined as follows:

$$H_1(k) = \begin{cases} 1 & \text{for } k < k_1 \\ \cos^2\left(\frac{\pi}{2}\frac{k-k_1}{k_2-k_1}\right) & \text{for } k_1 \leq k < k_2 \\ 0 & \text{for } k_2 \leq k, \end{cases} \quad (1)$$

where k is the modulus of the spatial frequency, and $k_1$, $k_2$ are design parameters for the filter. Typical value ranges are $0<k_1<4$ lp/cm (line pairs per centimeter) and $1$ lp/cm$<k_2<6$ lp/cm. The design parameters $k_1$, $k_2$ can be predefined by calibration reconstructions, wherein the filtering can be performed for different values of the design parameters $k_1$, $k_2$ and wherein the values of the design parameters $k_1$, $k_2$ can be selected, which lead to minimized image artifacts. Design parameter values can be determined for different objects or for different parts of the object, in order to provide for each object or each part of an object optimized design parameter values.

The second transfer function is preferentially adapted such that the sum of the first transfer function and the second transfer function is one. However, the first transfer function and the second transfer function can also be adapted such that the sum of these transfer functions is a low-pass transfer function. This can lead to a combination image, which has a reduced spatial resolution, which may be desired if the structures of interest do not require a very high spatial resolution, and which can have a further reduced noise. A preferred low-pass transfer function $H_d(k)$, which can be the result of summing up the first transfer function and the second transfer function, can be defined as follows:

$$H_d(k) = \begin{cases} 1 & \text{for } k < \tilde{k}_1 \\ \cos^2\left(\frac{\pi}{2}\frac{k-\tilde{k}_1}{\tilde{k}_2-\tilde{k}_1}\right) & \text{for } \tilde{k}_1 \leq k < \tilde{k}_2 \\ 0 & \text{for } \tilde{k}_2 \leq k, \end{cases} \quad (2)$$

wherein $\tilde{k}_1, \tilde{k}_2$ are the design parameters, which can be determined by calibration reconstructions as described above.

In a further embodiment, the first transfer function and the second transfer function are adapted such that the sum of these transfer functions is an edge enhancing transfer function. The edge enhancing transfer function can be adapted enhance desired frequency components, in order to obtain a corresponding edge enhancement. If the combination image comprises enhanced edges, these edges can be easier identified by a user like a physician or by an algorithm like a segmentation algorithm which uses the enhanced edges.

In a preferred embodiment the first filter is adapted such that predefined high frequencies pass the first filter, if the first filter is applied to the analytical image, and wherein the second filter is adapted such that the predefined high frequencies are suppressed by the second filter, if the second filter is applied to the iterative image. Since also predefined high frequencies of the analytical image pass the first filter, the combined final image can comprise a noise texture which does not correspond to the minimally possible noise, but to a larger noise. For example, the predefined high frequencies of the analytical image, which pass the first filter and which are therefore present in the combined final image, can be chosen such that the combined final image has a noise texture which corresponds to a desired noise texture, in particular, to a noise texture wanted by radiologists and/or to a noise texture to which radiologists are familiarized.

In a further embodiment, the first transfer function defining the first filter can be defined as follows:

$$H_1(k) = \begin{cases} 1 & \text{for } k < k_1 \\ \varepsilon + (1-\varepsilon)\cos^2\left(\frac{\pi}{2}\frac{k-k_1}{k_2-k_1}\right) & \text{for } k_1 \leq k < k_2 \\ 0 & \text{for } k_2 \leq k \end{cases} \quad (3)$$

with an additional parameter $\varepsilon$ that is typically in the range of 0.05 to 0.4. Also the additional parameter $\varepsilon$ can be determined by calibration reconstructions, wherein for different objects or for different parts of an object different values of the additional parameter $\varepsilon$ can be provided, wherein the respective value of the additional parameter $\varepsilon$ is optimized for the respective object or the respective part of an object. The parameters $k_1, k_2$ are the above mentioned design parameters, which may be within the above mentioned typical value ranges.

The detection data providing unit can be a storage unit in which the detection data are stored already. However, the detection data proving unit can also be an acquisition unit for acquiring the detection data, which preferentially projection data. For example, the detection data providing unit can comprise a radiation source for generating radiation for traversing the object of interest and a detection unit for detecting the radiation after having traversed the object of interest and for generating the detection data depending on the detected radiation. The radiation source is preferentially an x-ray source and the detection unit is preferentially adapted to detect x-rays after having traversed the object of interest. The imaging apparatus can be a computed tomography apparatus or a C-arm x-ray apparatus. The imaging apparatus can also be another imaging modality like a nuclear imaging modality, for example, a single photon emission computed tomography apparatus or a positron emission tomography apparatus, wherein the radiation source is a nuclear emitter and the detection unit is adapted to detect the emitted nuclear radiation.

It is further preferred that the analytical reconstruction unit is adapted to reconstruct the analytical image by using at least one of the following reconstruction methods: wedge filtered backprojection as described in, for example, the article "Redundant data and exact helical cone-beam reconstruction" by D. Heuscher et al., Physics in Medicine and Biology, No. 49, pages 2219 to 2238, 2004; extended parallel filtered backprojection as described in, for example, the article "Extended parallel backprojection for standard three-dimensional and phase-correlated four-dimensional axial and spiral cone-beam CT with arbitrary pitch, arbitrary cone-angle, and 100% dose usage" by M. Kachelrieβ et al., Institute of Medical Physics, June 2004; filtered backprojection without parallel rebinning as described in, for example, the article "A new weighting scheme for cone-beam helical CT to reduce the image noise" by K. Taguchi, Physics in Medicine and Biology, No. 49, pages 2351 to 2364, 2004; weighted filtered backprojection as described in, for example, the article "Weighted FBP—a simple approximate 3D FBP algorithm for multislice spiral CT with good dose usage for arbitrary pitch" by K. Stierstorfer et al., Physics in Medicine and Biology, No. 49, pages 2209 to 2218, 2004; angular weighted hybrid circular reconstruction as described in, for example, the article "Angular weighted hybrid cone-beam CT reconstruction for circular trajectories" by M. Grass et al., Physics in Medicine and Biology, No. 46, pages 1595 to 1610, 2001.

It is also preferred that the iterative reconstruction unit is adapted to reconstruct the iterative image by using at least one of the following reconstruction methods: algebraic reconstruction technique (ART) as described in, for example, the article "Algebraic Reconstruction Techniques Can Be Made Computationally Efficient" by G. T. Herman, IEEE Transactions on medical imaging, Vol. 12, No. 3, September 1993, simultaneous algebraic reconstruction technique (SART) as described in, for example, the article "Rapid 3-D Cone-Beam Reconstruction with the Simultaneous Algebraic Reconstruction Technique (SART) Using 2-D Texture Mapping Hardware" by K. Mueller et al., IEEE Transactions on medical imaging, Vol. 19, No. 12, December 2000, maximum likelihood reconstruction. Several embodiments of the known maximum likelihood reconstruction are disclosed in, for example, the book "Statistical Image Reconstruction Methods for Transmission Tomography" by J. A. Fessler, University of Michigan, wherein the iterative reconstruction unit can be adapted to use one of these embodiments of the maximum likelihood reconstruction.

These reconstruction methods allow reconstructing analytical and iterative images, respectively, with high image quality.

In a further aspect of the present invention an imaging method for imaging an object of interest is presented, wherein the imaging method comprises:

providing detection data being indicative of the object of interest, analytically reconstructing an analytical image of the object from the detection data, iteratively reconstructing an iterative image of the object from the detection data, and combining the analytical image and the iterative image for generating a combination image.

In a further aspect of the present invention an imaging computer program for imaging an object of interest is presented, wherein the imaging computer program comprises program code means for causing an imaging apparatus as defined in claim 1 to carry out the steps of the imaging method as defined in claim 11, when the imaging computer program is run on a computer controlling the imaging apparatus.

It shall be understood that the imaging apparatus of claim 1, the imaging method of claim 11 and the imaging computer program of claim 12 have similar and/or identical preferred embodiments as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

In the following drawings:

FIG. 3 shows schematically and exemplarily several intermediate images and a finally reconstructed combination image.

DETAILED DESCRIPTION OF EMBODIMENTS

Figure 1:
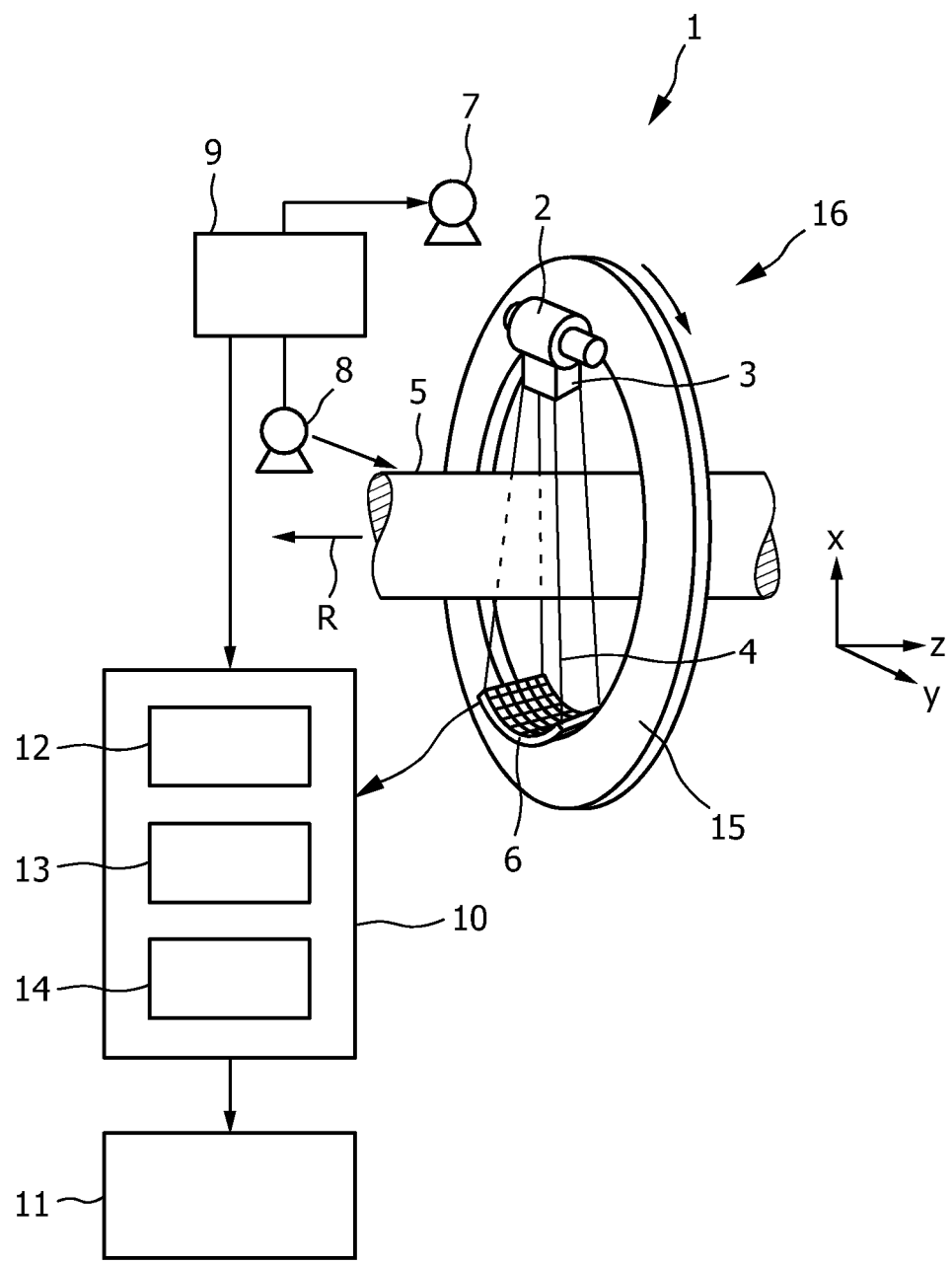
FIG. 1 shows schematically and exemplarily an embodiment of an imaging apparatus for imaging an object of interest.

FIG. 1 shows schematically and exemplarily an imaging apparatus for imaging an object of interest. In this embodiment, the imaging apparatus 1 is a computed tomography apparatus. The computed tomography apparatus 1 comprises a detection data providing unit 16 for providing projection data being indicative of the object of interest. The detection data providing unit 16 includes a gantry 15 which is capable of rotation about a rotational axis R which extends parallel to a z direction. A radiation source 2, which is, in this embodiment, an X-ray tube, is mounted on the gantry 15. The radiation source 2 is provided with a collimator 3, which forms, in this embodiment, a conical radiation beam 4 from the radiation generated by the radiation source 2. The radiation traverses the object of interest (not shown), such as a person or a part of a person, in an examination zone 5 which is, in this embodiment, cylindrical. After having traversed the examination zone 5 the radiation beam 4 is incident on a detection unit 6 which comprises a two-dimensional detection surface. The detection unit 6 is mounted on the gantry 15.

The detection data providing unit 16 comprises two motors 7, 8. The gantry 15 is driven at a preferably constant but adjustable angular speed by the motor 7. The motor 8 is provided for displacing the object arranged on a table, in particular, arranged on a patient table, in the examination zone 5 parallel to the direction of the rotational axis R or the z axis. These motors 7, 8 are controlled by a control unit 9, for instance, such that the radiation source 2 and the examination zone 5 and, thus, the object of interest within the examination zone 5 move relative to each other along a helical trajectory. However, it is also possible that the object or the examination zone 5 is not moved, but that only the radiation source 2 is rotated, i. e. that the radiation source 2 moves along a circular trajectory relative to the object or the examination zone 5. Furthermore, in another embodiment, the collimator 3 can be adapted for forming another beam shape, in particular, a fan beam, and the detection unit 6 can comprise a detection surface, which is shaped corresponding to the other beam shape, in particular, to the fan beam.

During a relative movement of the radiation source 2 and the examination zone 5 the detection unit 6 generates detection data, in this embodiment projection data, depending on the radiation incident on the detection surface of the detection unit 6.

The detection data are provided to an image generation device 10 for generating an image of the object of interest from the detection data. The image generation device 10 comprises an analytical reconstruction unit 12 for analytically reconstructing an analytical image of the object from the detection data, an iterative reconstruction unit 13 for iteratively reconstructing an iterative image of the object from the detection data, and a combination unit 14 for combining the analytical image and the iterative image for generating a combination image. The combination image is provided to a display unit 11 for displaying the combination image.

Also the image generation device 10 is preferably controlled by the control unit 9. In another embodiment, the image generation device 10 can also comprise an own control unit for controlling the image generation device 10.

The analytical reconstruction unit 12 is preferentially adapted to reconstruct the analytical image by applying a filtered backprojection algorithm to the detection data, for example, one of the above mentioned wedge filtered backprojection, extended parallel filtered backprojection, filtered backprojection without parallel rebinning, weighted backprojection and angular weighted hybrid circular reconstruction. The analytical reconstruction unit 12 can also be adapted to apply another analytical reconstruction algorithm to the detection data.

The iterative reconstruction unit 13 is preferentially adapted to reconstruct the iterative image by using a maximum likelihood method as disclosed in, for example, the above mentioned book by J. A. Fessler. In another embodiment, the iterative reconstruction unit can be adapted to use another iterative reconstruction method like the one described in, for example, "Correction of gain fluctuations in iterative tomographic image reconstruction" by J.-B. Thibault et al., 9$^{th}$ International Meeting on Fully Three-Dimensional Image Reconstruction in Radiology and Nuclear Medicine, pages 112 to 115.

The combination unit 14 is adapted to combine the analytical image and the iterative image in the Fourier domain. In particular, the combination unit 14 is adapted to apply a first filter to the analytical image for low-pass filtering the analytical image, in order to generate a filtered analytical image, and to apply a second filter to the iterative image for high-pass filtering the iterative image, in order to generate a filtered iterative image. The combination unit 14 is further adapted to combine the filtered analytical image and the filtered iterative image. The combination unit 14 is preferentially adapted to sum the filtered analytical image and the filtered iterative image, in order to combine these filtered images. The combination unit can also be adapted to weightedly average the filtered analytical image and the filtered iterative image.

The combination unit 14 can be adapted to perform the filtering by Fourier transforming the analytical image and the iterative image, applying a first transfer function, which defines the first filter, to the Fourier transformed analytical image, applying a second transfer function, which defines the second filter, to the Fourier transformed iterative image, and inversely Fourier transforming the analytical image and the iterative image. The combination unit 14 can be adapted to combine the filtered analytical image and the filtered iterative image in the Fourier domain or in the spatial domain. Thus, the combination unit 14 can be adapted to combine the filtered analytical image and the filtered iterative image before the inverse Fourier transformation is performed or after the inverse Fourier transformation has been performed, wherein, of course, if the combination is performed before the inverse Fourier transformation is carried out, the resulting combination image is inversely Fourier transformed. In the Fourier domain, the first and second transfer functions are preferentially applied to the Fourier transformed analytical image and the Fourier transformed iterative image, respectively, by multiplying the respective transfer function by the respective Fourier transformed image.

The combination unit 14 can be adapted to use, for example, the first transfer function defined in equation (1) or the first transfer function defined in equation (3). The second transfer function is preferentially adapted such that the sum of the first transfer function and the second transfer function is one. However, the second transfer function can also be chosen such that the sum of the first transfer function as defined in, for example, equation (1) or equation (3) and the second transfer function is a low-pass transfer function as defined in, for example, equation (2) or an edge enhancing transfer function.

Although the combination unit as being described above is performing the filtering operations in the Fourier domain, the combination unit can also be adapted to perform the filtering operations in the spatial domain, wherein filters, which mainly low-pass filter or high-pass filter the respective image and which correspond to the above mentioned filters for the Fourier domain, are provided in the spatial domain.

In an embodiment, the first filter is adapted such that predefined high frequencies pass the first filter, if the first filter is applied to the analytical image, and the second filter is adapted such that the predefined high frequencies are suppressed by the second filter, if the second filter is applied to the iterative image.

Figure 2:
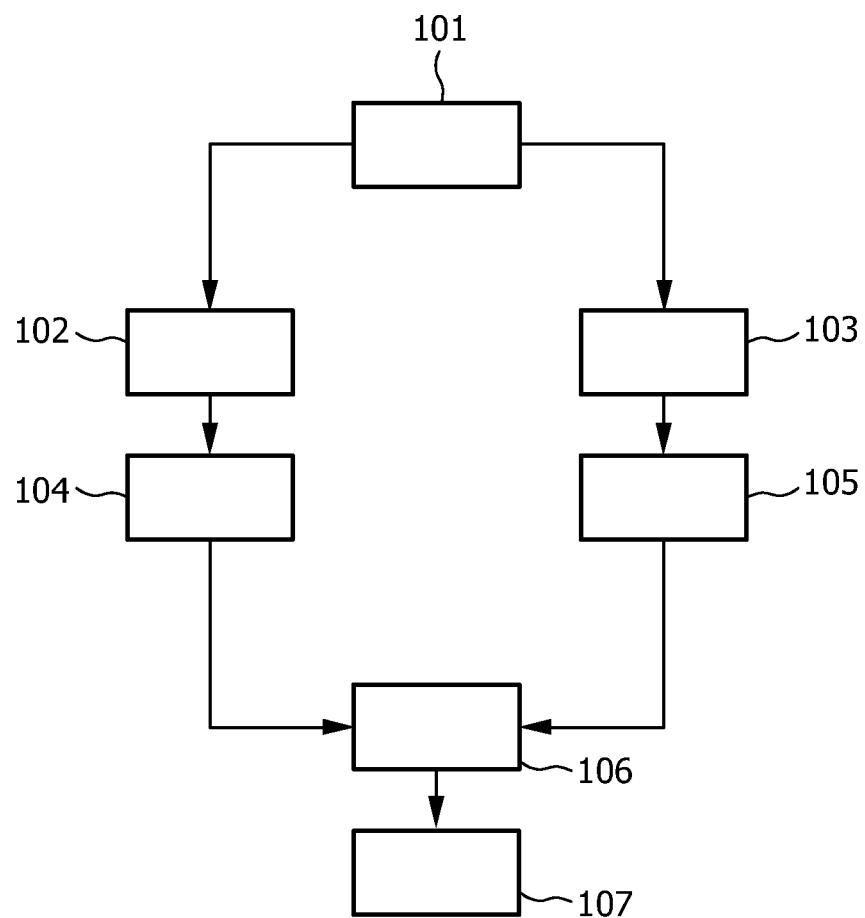
FIG. 2 shows a flowchart exemplarily illustrating an embodiment of an imaging method for imaging an object of interest.

In the following an embodiment of an imaging method for imaging an object of interest will exemplarily be described with reference to a flowchart shown in FIG. 2.

The imaging method for imaging an object of interest is, in this embodiment, a computed tomography imaging method. In step 101, the detection data providing unit 16 provides detection data, in this embodiment, projection data, being indicative of the object of interest. In particular, the radiation source 2 rotates around the rotational axis R and the object or the examination zone 5 is not moved, i.e. the radiation source 2 travels along a circular trajectory around the object or the examination zone 5. In another embodiment, the radiation source 2 can move along another trajectory, for example, a helical trajectory, relative to the object. The radiation source 2 emits radiation traversing the object of interest, wherein the radiation, which has traversed the object of interest, is detected by the detection unit 6 for generating the detection data.

The detection data are transferred to the image generation device 10, and, in step 102, the analytical reconstruction unit 12 analytically reconstructs an analytical image 17 of the object from the detection data. The analytical image 17 of a thorax of a person is schematically and exemplarily shown in FIG. 3. In step 103, the iterative reconstruction unit 13 iteratively reconstructs an iterative image 18 of the object from the detection data. The iterative image 18 is schematically and exemplarily shown in FIG. 3.

In step 104, the combination unit 14 applies a first filter to the analytical image 17 for low-pass filtering the analytical image 17, thereby generating a filtered analytical image 19, and, in step 105, the combination unit 14 applies a second filter to the iterative image 18 for high-pass filtering the iterative image 18, thereby generating a filtered iterative image 20. The filtering can be performed in the Fourier domain or in the spatial domain, wherein in FIG. 3 all images are shown in the spatial domain. In step 104, the first filter may not only low-pass filter the analytical image 17, but may also allow predefined high spatial frequencies to pass the first filter, and, in step 105, the second filter may not only high-pass filter the iterative image 18, but may also suppress the predefined high spatial frequencies in the iterative image 18.

In step 106, the combination unit 14 combines the filtered analytical image 19 and the filtered iterative image 20 for generating a combination image 21 as schematically and exemplarily shown in FIG. 3.

In step 107, the combined image is shown on the display 11.

Iterative reconstruction is one of the most promising techniques to decrease the X-ray dose applied to persons or animals during a computed tomography scan. However, iterative reconstruction is more sensitive to some problems during data preprocessing than analytical methods.

In particular, problems during correction for tube current fluctuations or air calibration can lead to shading artifacts in images reconstructed with iterative methods. It may be possible to overcome the problem by a dedicated additional modeling of physical effects. For instance, the article "Correction of Gain Fluctuations in Iterative Tomographic Image Reconstruction" by J.-B. Thibault et al., 9th International Meeting on Fully Three-Dimensional Image Reconstruction in Radiology and Nuclear Medicine, pages 112 to 115, 2007 discloses a mitigation of shading artifacts caused by tube output fluctuations by explicitly modeling the tube output as a separate parameter that is fitted during reconstruction. Although this reduces shading artifacts caused by tube output fluctuations, this method adds additional complexity to the reconstruction and, furthermore, it can be applied only to this particular problem.

The imaging apparatus and imaging method for imaging an object of interest, which have been described above with reference to FIGS. 1 to 3, can reduce, in particular, eliminate, shading artifacts in images obtained by iterative reconstruction methods by combining the results of analytical and iterative reconstruction methods in the Fourier domain. Specifically, the low-frequency components of an image can be taken from an analytical reconstruction and the high frequency components can be taken from the iterative reconstruction. Noise, which may predominantly located in the high spatial frequencies of the reconstructed image, is still efficiently suppressed by the iterative reconstruction part of the method, because the high spatial frequencies are taken from the iterative reconstruction. On the other hand, no or reduced shading artifacts induced by pre-processing imperfections in the iteratively reconstructed image will show up in the final combined image, because the low spatial frequencies are taken from the analytically reconstructed image. The low-pass filtering of the analytical image is performed by the first filter which can be adapted such that a certain, fixed amount of high frequencies can still pass the filter operation. The high pass filtering is performed by the second filter which can be adapted to correspondingly suppress the high frequencies to a certain amount.

At least one of the analytical reconstruction unit 12, the iterative reconstruction unit 13 and the combination unit 14 can be adapted to perform further artifacts reducing procedures like a beam hardening correction algorithm.

Although in the above described embodiments the imaging apparatus is a computed tomography apparatus, the imaging apparatus can also be another imaging apparatus like a X-ray C-arm apparatus or a nuclear imaging apparatus like a single photon emission computed tomography apparatus or a positron emission tomography apparatus.

Although in the above described embodiments the object of interest is a person or an animal or a part of a person or of an animal, in other embodiments the object of interest can also be a technical object.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Reconstruction, filtering, combination, et cetera procedures performed by one or several units or devices can be performed by any other number of units or devices. For example, steps 102 to 106 can be performed by a single unit or by any other number of different units. The reconstruction, filtering, combination, et cetera procedures and/or the control of the imaging apparatus in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an imaging apparatus for imaging an object of interest. An analytical reconstruction unit analytically reconstructs an analytical image of the object from detection data, in particular, from projection data, and an iterative reconstruction unit iteratively reconstructs an iterative image of the object from the detection data, wherein a combination unit combines the analytical image and the iterative image for generating a combination image. An iterative image can comprises shading artifacts, which may be caused by preprocessing the detection data before performing the iterative reconstruction. An analytical image shows reduced shading artifacts, in particular, shows no shading artifacts at all. Thus, by combining the analytical image and the iterative image a combination image can be generated, in which the shading artifacts are reduced in comparison to an iterative image, thereby improving the quality of the reconstructed final image of the object of interest.

The invention claimed is:

1. An imaging apparatus for imaging an object of interest, the imaging apparatus comprising:
   an imaging device that detects at least one of x-ray or gamma radiation and generates electronic detection data that is indicative of the object of interest, and
   an image generation computer device that includes:
      an analytical reconstruction processor that analytically reconstructs an analytical image of the object in electronic format from the electronic detection data,
      an iterative reconstruction processor that iteratively reconstructs an iterative image of the object in electronic format from the electronic detection data, and
      a combination processor, including:
         a first filter that low-pass filters the analytical image generating a low pass filtered analytical image,
         a second filter that high-pass filters the iterative image generating a high-pass filtered iterative image, and
         a combiner that combines the low pass filtered analytical image and the high-pass filtered iterative image generating a combination filtered image of the object in the electronic format.

2. The imaging apparatus as defined in claim 1, wherein the first filter includes a first transfer function, the second filter includes a second transfer function, and a summation of the first transfer function and the second transfer function is equal to one.

3. The imaging apparatus as defined in claim 1, wherein the first filter includes a first transfer function, the second filter includes a second transfer function, and a summation of the first transfer function and the second transfer function is a low-pass transfer function.

4. The imaging apparatus as defined in claim 1, wherein the first filter includes a first transfer function, the second filter includes a second transfer function, and a summation of the first transfer function and the second transfer function is an edge enhancing transfer function.

5. The imaging apparatus as defined in claim 1, wherein the first filter is adapted such that predefined high frequencies pass the first filter, if the first filter is applied to the analytical image, and wherein the second filter is adapted such that the predefined high frequencies are suppressed by the second filter, if the second filter is applied to the iterative image.

6. The imaging apparatus as defined in claim 1, wherein the electronic detection data are projection data.

7. The imaging apparatus as defined in claim 1, wherein the imaging device comprises:
   a radiation source that generates radiation that traverses the object of interest; and
   a two-dimensional detection surface that detects the radiation that traversed the object of interest and that generates the electronic detection data depending on the detected radiation.

8. The imaging apparatus as defined in claim 1, wherein the analytical reconstruction processor is adapted to reconstruct the analytical image by using at least one of the following reconstruction methods: wedge filtered backprojection, extended parallel filtered backprojection, filtered backprojection without parallel rebinning, weighted filtered backprojection, angular weighted hybrid circular reconstruction.

9. The imaging apparatus as defined in claim 1, wherein the iterative reconstruction processor is adapted to reconstruct the iterative image by using at least one of the following reconstruction methods: algebraic reconstruction technique (ART), simultaneous algebraic reconstruction technique (SART), maximum likelihood reconstruction.

10. An imaging method for imaging an object of interest, the imaging method comprising:
- providing electronic projection data indicative of the object of interest, wherein the projection data is generated by hardware of an imaging device,
- analytically reconstructing, with a processor, an analytical image of the object from the projection data, producing an analytical image in electronic format,
- low-pass filtering with a first filter the analytical image producing a low pass filtered analytical image,
- iteratively reconstructing, with the processor, an iterative image of the object from the same detection data, producing an iterative image in electronic format,
- high-pass filtering with a second filter the iterative image producing a high pass filtered iterative image, and
- generating, with the processor, a combination filtered image of the object in electronic format by combining the low pass filtered analytical image and the low high filtered iterative image to generate the combination filtered image of the object in electronic format; and
- visually displaying the combination filtered image on a display.

11. A non-transitory computer readable medium encoded with an imaging computer program for imaging an object of interest, which, when executed by a computer causes the computer to:
- analytically reconstruct an analytical image of an object from projection data produced by a detector of an imaging system, producing an analytical image in electronic format,
- low-pass filter the analytical image producing a low pass filtered analytical image,
- iteratively reconstruct an iterative image of the object from the same projection data, producing an iterative image in electronic format,
- high-pass filter the iterative image producing a high pass filtered iterative image,
- constructing an image in electronic format by combining the low pass filtered analytical image and the low high filtered iterative image; and
- visually display the image.

12. The method of claim 10, wherein the first filter is adapted such that predefined high frequencies pass the first filter, if the first filter is applied to the analytical image, and wherein the second filter is adapted such that the predefined high frequencies are suppressed by the second filter, if the second filter is applied to the iterative image.

13. The method of claim 10, further comprising:
- summing the low pass filtered analytical image and the high-pass filtered iterative image to generate the combination filtered image of the object in the electronic format.

14. The method of claim 10, further comprising:
- weightily averaging the low pass filtered analytical image and the high-pass filtered iterative image to generate the combination filtered image of the object in the electronic format.

15. The method of claim 10, further comprising:
- Fourier transforming the analytical image and the iterative image;
- transforming, with a first transfer function of the first filter, the Fourier transformed analytical image;
- transforming, with a second transfer function of the second filter, the Fourier transformed iterative image; and
- inversely Fourier transforming the transformed Fourier transformed analytical image and the transformed Fourier transformed iterative image.

16. The method of claim 15, wherein the combining includes combining the transformed Fourier transformed analytical image and the transformed Fourier transformed iterative image before inversely Fourier transforming the transformed Fourier transformed analytical image and inversely Fourier transforming the transformed Fourier transformed iterative image, and inversely Fourier transforming the combination.

17. The method of claim 15, wherein the combining includes combining the inversely Fourier transformed transformed Fourier transformed analytical image and the inversely Fourier transformed transformed Fourier transformed iterative image.

18. The method of claim 10, further comprising:
- combining the filtered analytical image and the filtered iterative image in the spatial domain.

19. The method of claim 10, further comprising:
- visually displaying the combination filtered image on a display.

20. The non-transitory computer readable medium of claim 11, wherein predefined high frequencies pass the high pass filtering, if the high pass filtering is applied to the analytical image, and wherein the predefined high frequencies are suppressed by the low pass filtering, if the low pass filtering is applied to the iterative image.

* * * * *